(12) United States Patent
Ling

(10) Patent No.: US 11,500,445 B2
(45) Date of Patent: Nov. 15, 2022

(54) METHOD AND APPARATUS FOR CONTROLLING HARDWARE DEVICE, ELECTRONIC DEVICE AND STORAGE MEDIUM

(71) Applicant: HORIZON (SHANGHAI) ARTIFICIAL INTELLIGENCE TECHNOLOGY CO., LTD., Shanghai (CN)

(72) Inventor: Xiaofeng Ling, Shanghai (CN)

(73) Assignee: HORIZON (SHANGHAI) ARTIFICIAL INTELLIGENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/173,908

(22) Filed: Feb. 11, 2021

(65) Prior Publication Data
US 2021/0247830 A1  Aug. 12, 2021

(30) Foreign Application Priority Data

Feb. 12, 2020 (CN) .......................... 202010088590.3

(51) Int. Cl.
*G06F 1/32* (2019.01)
*G06F 1/324* (2019.01)
(Continued)

(52) U.S. Cl.
CPC .............. *G06F 1/324* (2013.01); *G06F 1/325* (2013.01); *G06F 1/3237* (2013.01); *G06F 1/3287* (2013.01)

(58) Field of Classification Search
CPC .... G06F 1/3203; G06F 1/3206; G06F 1/3228; G06F 1/324; G06F 1/3287; G06F 1/325; G06F 1/3237; G06F 1/3296
See application file for complete search history.

(56) References Cited

U.S. PATENT DOCUMENTS 5,371,693 A * 12/1994 Nakazoe ............... G06F 1/3215
713/321
5,396,635 A * 3/1995 Fung ..................... G06F 1/3287
713/323

(Continued)

*Primary Examiner* — Jaweed A Abbaszadeh
*Assistant Examiner* — Cheri L Harrington
(74) *Attorney, Agent, or Firm* — Brooks Kushman P.C.

(57) ABSTRACT

Disclosed are a method and apparatus for controlling a hardware module, electronic device and storage medium. In an embodiment of the present disclosure, the method may include: timing a waiting state of the hardware module to obtain a current waiting duration of the hardware module when it enters a first waiting state; generating an interrupt signal based on the current waiting duration; determining program information corresponding to the current waiting duration under triggering from the interrupt signal; executing an action corresponding to the program information for the hardware module, and controlling it to enter a second waiting state. In the present disclosure, the hardware module is controlled to execute actions corresponding to different programs based on different waiting durations through an interrupt mechanism, thus controlling the hardware module to switch between waiting states with different power consumption, and achieving a good balance between energy saving and performance.

20 Claims, 4 Drawing Sheets

(51) Int. Cl.
    *G06F 1/3287*     (2019.01)
    *G06F 1/3234*     (2019.01)
    *G06F 1/3237*     (2019.01)

(56) References Cited

U.S. PATENT DOCUMENTS

| | | | | |
|---|---|---|---|---|
| 5,504,907 | A * | 4/1996 | Stewart | G06F 1/3203 |
| | | | | 713/321 |
| 5,752,044 | A * | 5/1998 | Crump | G06F 9/30083 |
| | | | | 713/323 |
| 6,128,745 | A * | 10/2000 | Anderson | G06F 1/3203 |
| | | | | 713/323 |
| 6,665,802 | B1 * | 12/2003 | Ober | G06F 1/26 |
| | | | | 713/320 |
| 2006/0020842 | A1 * | 1/2006 | Olsen | G06F 1/3228 |
| | | | | 713/502 |
| 2008/0005599 | A1 * | 1/2008 | Theocharous | G06F 1/3209 |
| | | | | 713/300 |
| 2008/0271035 | A1 * | 10/2008 | Yasukawa | G06F 1/3237 |
| | | | | 718/104 |
| 2010/0218019 | A1 * | 8/2010 | Eckhard | G06F 1/3203 |
| | | | | 713/322 |
| 2012/0246501 | A1 * | 9/2012 | Haruki | G06F 1/324 |
| | | | | 713/323 |
| 2013/0318383 | A1 * | 11/2013 | Takizawa | G06F 1/3234 |
| | | | | 713/323 |
| 2014/0344599 | A1 * | 11/2014 | Branover | G06F 1/3287 |
| | | | | 713/323 |
| 2015/0327167 | A1 * | 11/2015 | Ljung | H04W 76/28 |
| | | | | 370/311 |
| 2017/0068308 | A1 * | 3/2017 | Park | G06F 1/3228 |
| 2018/0232036 | A1 * | 8/2018 | Varadarajan | G06F 1/3287 |
| 2021/0224376 | A1 * | 7/2021 | Gupta | G06F 21/45 |

* cited by examiner

METHOD AND APPARATUS FOR CONTROLLING HARDWARE DEVICE, ELECTRONIC DEVICE AND STORAGE MEDIUM

CROSS-REFERENCE TO RELATED APPLICATIONS

This application claims priority to Chinese Application Serial No. CN202010088590.3 filed Feb. 12, 2020, the disclosure of which is incorporated in its entirety by reference herein.

TECHNICAL FIELD

The present disclosure relates to the field of artificial intelligence technology, and in particular, relates to a method and an apparatus for controlling a hardware module, an electronic device and a storage medium.

BACKGROUND

A hardware module is a part integrated on a system on chip (SoC) which performs specialized processing on an artificial intelligent algorithm, such as a processor for convolution operation, and the like. The hardware module can be controlled by a general purpose processor. When there is no task to execute, the hardware module needs to enter an energy-saving state to save power.

SUMMARY

Related technology is to directly switch the hardware module to a certain energy-saving state to cut power consumption. However, there is a certain delay in exiting the energy-saving state. If the hardware module frequently enters and exits immediately the energy-saving state, it will not only affect the task execution of the hardware module, but also cause additional power consumption. In order to solve such technical problem, embodiments of the present disclosure provide a method and an apparatus for controlling a hardware module, an electronic device and a storage medium, enabling the hardware module to achieve a better balance between energy saving and performance.

According to an aspect of the present disclosure, there is provided a method for controlling a hardware module, including:

timing a waiting state of a hardware module to obtain a current waiting duration of the hardware module when the hardware module enters a first waiting state;

generating an interrupt signal based on the current waiting duration;

determining program information corresponding to the current waiting duration under triggering from the interrupt signal; and executing an action corresponding to the program information for the hardware module, and controlling the hardware module to enter a second waiting state.

According to another aspect of the present disclosure, there is provided an apparatus for controlling a hardware module, including:

a timer module, which is configured to time a waiting state of the hardware module to obtain a current waiting duration of the hardware module when the hardware module enters a first waiting state, and to generate an interrupt signal based on the current waiting duration;

a determining module, which is configured to determine program information corresponding to the current waiting duration under triggering from the interrupt signal; and an execution module, which is configured to execute an action corresponding to the program information for the hardware module, and to control the hardware module to enter a second waiting state.

According to another aspect of the present disclosure, there is provided an electronic device, including: one or more processors; and a memory, which stores a computer program, when operated by the processor, enabling the processor to execute the above mentioned method for controlling the hardware module.

According to another aspect of the present application, there is provided a computer-readable storage medium having a computer program stored thereon, when operated by a processor, enabling the processor to execute the above mentioned method for controlling the hardware module.

According to embodiments of the present disclosure, the hardware module is controlled to execute actions corresponding to different programs on the basis of different waiting durations through an interrupt mechanism, thus the hardware modules are controlled to switch between waiting states with different power consumption, which realizes a good balance between energy saving and performance of the hardware module.

BRIEF DESCRIPTION OF THE DRAWINGS

The above and other objects, features and advantages of the present disclosure will become more apparent by describing embodiments of the present application in more detail combined with accompanying drawings. The accompanying drawings are configured to provide a further understanding of the embodiments of the present disclosure, constituting a part of the specification to explain the present disclosure together with the embodiments of the present disclosure but doing not constitute a limitation of the present application. In the accompanying drawings, the same reference signs usually represent the same components or steps.

DETAILED DESCRIPTION

Figure 1:
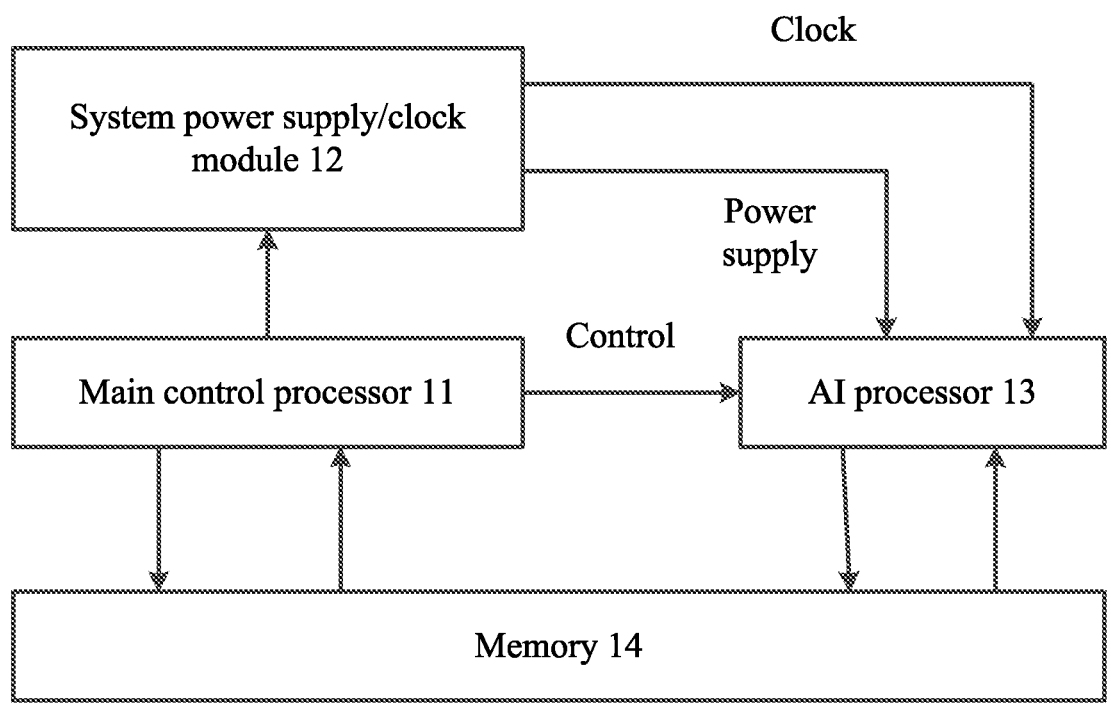
FIG. 1 is an exemplary deployment structure diagram of a system suitable for the present disclosure.

Exemplary embodiments of the present disclosure would be described in detail with reference to the accompany drawings. Obviously, the described embodiments are just only a part of, but not all of, embodiments of the present disclosure. It should be understood that the present disclosure is not limited by the exemplary embodiments of the present disclosure described herein.

Brief Introduction of the Present Disclosure

As mentioned above, in a case where a hardware module has no task to execute, it needs to enter an energy-saving state to cut power consumption. In particular, a hardware module, such as an artificial intelligence (AI) processor and the like, will always be in a waiting state when there is no task to execute, and at this time, the leakage is large, which will result in useless power consumption, accordingly, the hardware module needs to be turned off to save leakage power.

In a related technology, for energy-saving control of hardware module, such as an AI processor and the like, the hardware module is generally switched directly to a certain energy-saving state to save power. However, there is a certain delay in exiting the energy-saving state. If the hardware module frequently enters an energy-saving waiting state and then exit it immediately, for exiting the waiting state will have additional overhead, then such a situation that the hardware module frequently enters and exits a certain waiting state will affect the task execution of the hardware module, which leads to an increase of delay in system processing and additional power consumption, resulting in higher system power consumption.

In view of the above technical problem, the basic conception of embodiments of the present disclosure is to provide a method and an apparatus for controlling a hardware module, an electronic device and a storage medium, by means of which a waiting state of a hardware module is timed to obtain waiting duration of the hardware module in real time, and the hardware module is controlled to execute actions corresponding to different programs on the basis of different waiting durations through an interrupt mechanism, such that the hardware module is controlled to switch between different waiting states, thereby realizing a good balance between energy saving and performance of the hardware module, effectively avoiding influences on the task execution of the hardware module due to the hardware module frequently entering and/or exiting waiting states with different energy-saving conditions, meanwhile, reducing the power consumption caused by the hardware module frequently entering and/or exiting the waiting states with different energy-saving conditions.

Although the present disclosure primarily focuses on an AI processor, an AI model, etc., to describe the specific implementation details of embodiments of the present disclosure, it should be noted that embodiments of the present disclosure may be applicable to any scenarios where the power consumption of hardware module needs to be controlled, and the hardware module may also be any types of hardware. The hardware module is not limited to the above mentioned AI processor, the processor executing the convolution operation, etc., which may be a general purpose processor, a hardware circuit implemented by a Field-Programmable Gate Array (FPGA), or an Application Specific Integrated Circuit (ASIC) chip, and the like.

Exemplary System

FIG. 1 shows an exemplary architecture of an AI system 10 to which an embodiment of the present disclosure is applicable.

As shown in FIG. 1, the AI system 10 may include a main control processor 11, a system power supply/clock circuit 12, an AI processor 13, and a memory 14, all of which may be connected by a bus or other connection means.

The main control processor 11 may be responsible for allocating calculation tasks to the AI processor 13 and controlling the system power supply/clock circuit 12 and so on.

The system power supply/clock circuit 12 may be responsible for supplying power and providing clocks to various modules (including AI processor 13, etc.) in the AI chip, and is controlled by the main control processor 11.

The AI processor 13 may be configured to perform any operations related to AI algorithms. For example, the AI processor 13 may be configured to perform neural network calculations, such as any one or more of convolution operations, pooling operations, batch normalization operations, and activation function operations, and the like.

The memory 14 can be configured to store data and instruction parameters etc., and the main control processor 11 can be configured to control the AI processor 13 to read and store data from the memory 14 to perform AI algorithms. For example, the memory 14 may be configured to store data (such as input data, output data, parameter data, and the like) required by the AI processor 13 to execute AI algorithms, all information (such as following program information, linked list, and the like) required to control the AI processor 13, and information (such as the instruction sequence of AI algorithms, and the like) related to programs and/or data required by the main control processor 11 to control the system power supply/clock circuit 12 and the AI processor 13.

In practical application, the AI system 10 can be realized by a general purpose processor, a high-performance processor (such as, graphics processing unit (GPU), branch processing unit (BPU) and the like), FPGA, ASIC, or a combination thereof.

Exemplary Method

Figure 2:
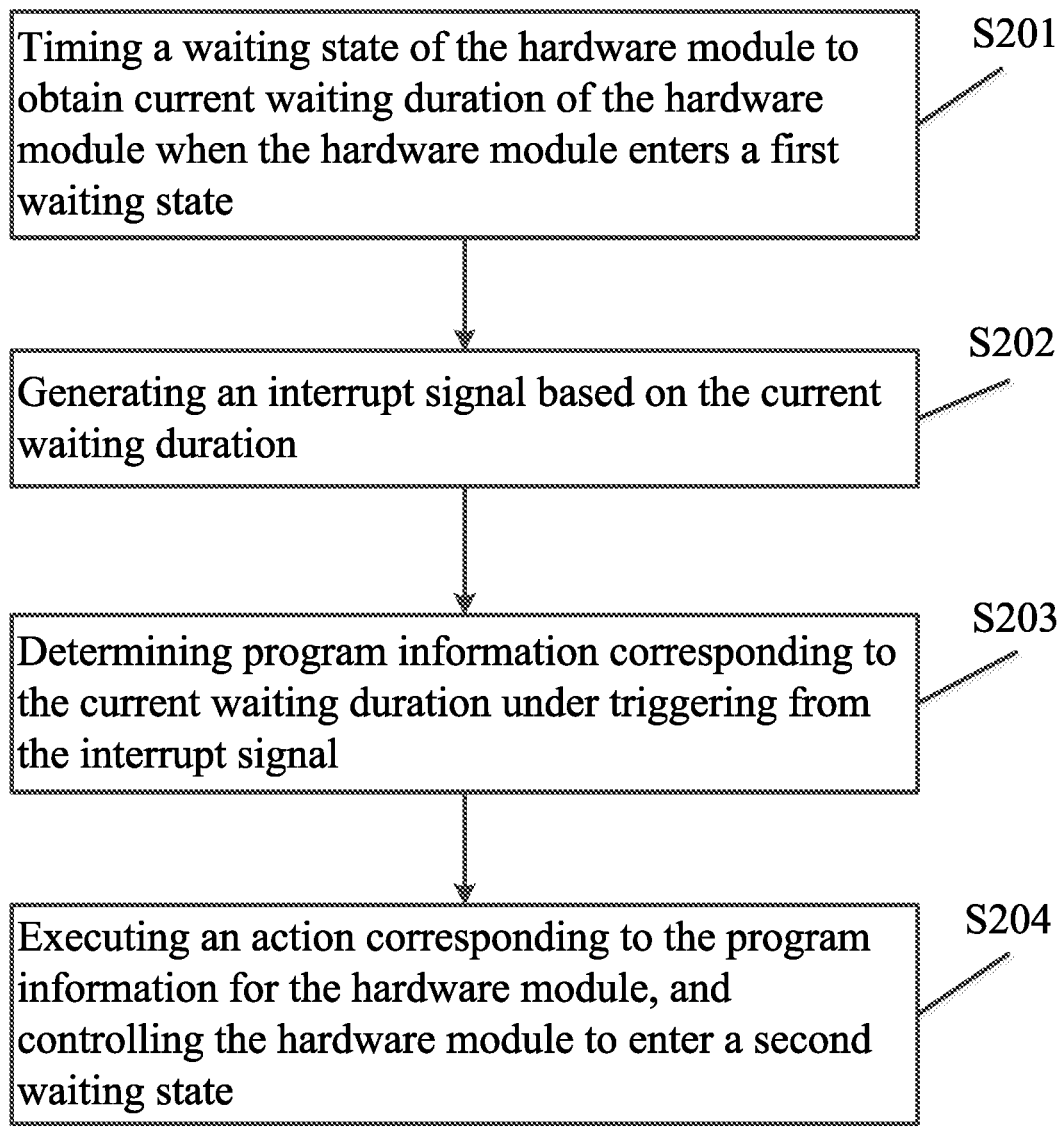
FIG. 2 is a flowchart diagram of a method for controlling a hardware module provided by an exemplary embodiment of the present disclosure.

FIG. 2 is a flow chart diagram of a method for controlling a hardware module according to an exemplary embodiment of the present disclosure. As shown in FIG. 2, the method for controlling a hardware module in the embodiment of the present disclosure may include the following steps:

Step S201: timing a waiting state of the hardware module to obtain current waiting duration of the hardware module when the hardware module enters a first waiting state;

Step S202, generating an interrupt signal based on the current waiting duration;

step S203, determining program information corresponding to the current waiting duration under triggering from the interrupt signal;

step S204: executing an action corresponding to the program information for the hardware module, and controlling the hardware module to enter a second waiting state.

In the embodiment of the present disclosure, a waiting state of the hardware module is timed to obtain waiting duration of the hardware module in real time, and the hardware module is controlled to execute actions corresponding to different programs on the basis of different waiting durations through an interrupt mechanism, thereby controlling the hardware module to switch between different waiting states, such that a good balance between energy saving and performance of the hardware module is realized, and it is effectively avoided for affecting the task execution of the hardware module due to the hardware module frequently entering and/or exiting waiting states with different energy-saving conditions, meanwhile, the power consumption caused by the hardware module frequently entering and/or exiting the waiting states of different energy-saving conditions can be reduced.

In the embodiment of the present disclosure, the power consumption of the hardware module in the first waiting state may be higher or lower than that in the second waiting state. In a case where the power consumption in the first waiting state is higher than that in the second waiting state, the above mentioned method of the embodiment of the present disclosure can be used to control the hardware module to execute an action with a deeper energy-saving degree in a certain waiting duration (for example, in a case where the waiting duration is long or gradually increases), so that the hardware module can save energy better without executing any task in a long time. Conversely, when the power consumption in the first waiting state is lower than that in the second waiting state, the above mentioned method of the embodiment of the present disclosure can be used to control the hardware module to switch to a waiting state which is easy to be awaken in a certain waiting duration (for example, in a case where a new task comes or in case of a waiting duration), so that the hardware module can be timely awakened to perform corresponding tasks. Here, the power consumption can be the power consumption of the entire hardware module, or one or more parameters related to the specific power consumption, such as leakages of the hardware module, and the like.

In the embodiment of the present disclosure, in step S202, the current waiting duration of the hardware module may be compared with a first preset threshold, and an interrupt signal may be generated in response to a result of comparison. Specifically, an interrupt signal may be generated in a case where the result of comparison indicates that the current waiting duration exceeds the first preset threshold corresponding to a preset timer, and the interrupt signal is used to trigger one or more of the following actions: a first action related to a working parameter, a second action related to a clock, and a third action related to a power supply. In this way, different interrupt signals can be generated for different waiting durations through a preset threshold, so as to enable the hardware module to be switched to different waiting states with different energy-saving degrees, thereby realizing a good balance between energy-saving and performance of the hardware module.

In the embodiment of the present disclosure, the hardware modules may be controlled to switch between different waiting states by configuring multiple hardware timers or by configuring multiple thresholds in one hardware timer. In other words, in some examples, the above mentioned preset timer may include multiple preset timers, and the first action, the second action, and the third action may respectively correspond to one or more of the multiple preset timers. Through multiple timers, different parts of the hardware module can be controlled more accurately and efficiently (for example, timer 1 can correspond to a controller of the hardware module, timer 2 can correspond to an operation circuit of the hardware module, and timer 3 can correspond to a cache memory of the hardware module), so as to enable the hardware module to enter different waiting states with different energy-saving depths, and then to realize a good balance between energy saving and performance of the hardware module.

In some examples, the above-mentioned method may further include: setting a plurality of timers and configuring a log sheet for each timer. For example, three timers can be pre-configured, namely a first timer, a second timer, and a third timer, and such three timers are respectively configured with different first preset thresholds and can be configured to control different aspects of the hardware module. For example, the first timer may correspond to working state control of the hardware module, the second timer may correspond to clock control of the hardware module, and the third timer may correspond to power supply control of the hardware module.

In the above-mentioned example, the process for configuring the log sheet of each timer may also be referred to as registering a timer, and the process of the registration may include creating a following log sheet for each timer. The log sheet for each timer may include at least one second preset threshold corresponding to the timers and corresponding relationships between the second preset threshold and the program information.

In some examples, the program information may include, but is not limited to, a storage address of a corresponding program in the memory. In other examples, such program information may also include other content, such as a pointer pointing to a program or other related information required for calling a program, and the like.

In some examples, the above-mentioned log sheet can be implemented through a linked list. In particular, while a timer is set, a linked list can be configured and stored for each timer. Here, the linked list for a certain timer may contain association relationships between the second preset thresholds and the information of programs (i.e. a first program, a second program, and a third program below) for controlling a certain or some portions of the hardware module, and the program information corresponding to the current waiting duration can be determined through querying the linked list for the timer, and then the program is called via the program information to control waiting states of a certain or some portions of the hardware module. For example, the linked list for the timer may include an identifier of the timer, each second preset threshold of the timer and program information corresponding to each second preset threshold (for example, entry information of a program, such as a pointer pointing to the program, a storage address of the program in the memory, and the like). In other examples, a linked list may also be uniformly configured for multiple timers.

In the above-mentioned example, the pre-configured timer may be a hardware timer or a software timer. For the specific type of a timer, it is not limited in the embodiment of the present disclosure. In general, a timer may be pre-configured according to the structure of the hardware module.

In the above mentioned example, the specific implementation process of step S202 may include: (a). in a case where the current waiting duration exceeds the first preset threshold of the first timer, the first timer generates a first interrupt signal which may be used to trigger a first action related to a working parameter including at least one of the following: a working voltage and a working frequency. (b). in a case where the current waiting duration exceeds the first preset threshold of the second timer, the second timer generates a second interrupt signal which may be used to trigger a second action related to a clock. (c). in a case where the current waiting duration exceeds the first preset threshold of the third timer, the third timer generates a third interrupt signal which may be used for triggering a third action related to a power supply.

In at least some embodiments, step S203 may include: querying a pre-configured log sheet corresponding to a preset timer under triggering from the interrupt signal, so as to determine program information corresponding to a second preset threshold which is closest to the current waiting duration and less than or equal to the current waiting duration, and the determined program information is the program information corresponding to the current waiting duration. In the embodiment of the present disclosure, an action of gradually deepening the energy-saving depth is performed by adopting a threshold which is increased gradually during an increase of the waiting duration, and the AI processor may be controlled to achieve a better balance between energy-saving and performance.

In the above mentioned embodiment, the first preset threshold may include a plurality of first preset thresholds correlating with a plurality of the preset timers, and the value of each first preset threshold is different. In this way, the hardware module may be conveniently controlled to perform different actions with different energy-saving depths at different time intervals through different hardware timers, and enter a corresponding waiting state, so that the hardware module achieves a better balance between energy-saving and performance.

In the above mentioned embodiment, the second preset threshold may include a plurality of groups of second preset thresholds correlating with a plurality of preset timers, wherein each group of second preset thresholds includes one or more second preset thresholds, and values of second preset thresholds are different each other. In this way, a corresponding part of the hardware module or the hardware module itself may be conveniently controlled, via a certain hardware timer, to perform different actions with different energy-saving depths at different time intervals by configuring different second preset thresholds, so that the hardware module achieves a better balance between energy-saving and performance.

Still taking the above three hardware timers as an example, the first preset threshold of the first timer may be smaller than the first preset threshold of the second timer, and the first preset threshold of the second timer may be smaller than the first preset threshold of the third timer. Each second preset threshold of the first timer is not equal but is between the first preset threshold of the first timer and the first preset threshold of the second timer. Each second preset threshold of the second timer is not equal but is between the first present threshold of the second timer and the first preset threshold of the third timer. Each second preset threshold of the third timer is not equal and is larger than the first preset threshold of the third timer. In this way, by means of two kinds of thresholds and the three timers, the hardware module can be controlled to perform energy-saving measures with different delays at different waiting durations, so as to avoid the loss of performance and power consumption caused by repeated state switching. It should be noted that first, second, and third in the first timer, the second timer, and the third timer mentioned in the present disclosure are only used for distinguishing different timers, and first and second in the first preset threshold and the second preset threshold are only used for distinguishing different kinds of thresholds, wherein the first preset threshold is used to triggering an interruption, and the second preset threshold is used for determining program information, the specific technical details of which may refer to the descriptions related to the first preset threshold and the second preset threshold in the context, and are not repeated here.

In at least some embodiments, in step S204, performing an action corresponding to the program information for the hardware module, may include: calling a corresponding program by using the program information, and operating it to execute one or more of following actions: lowering a working voltage of the hardware module to a predetermined value, turning off a general clock of the hardware module, and disconnecting a general power supply of the hardware module. In this way, the hardware module can enter the second waiting state with lower power consumption adapting to the current waiting duration, and execute an action with a deeper energy-saving degree in a case where the waiting duration is long, so that the hardware module saves energy better without executing any task in a long time, thus realizing a good balance between energy-saving degree and performance of the hardware module.

Still taking the above mentioned three hardware timers as an example, a specific implementation process of step S204 may include:

in a case of triggered by the first interrupt signal, calling a first program by means of the first program information, and operating the first program to control a power supply management unit in the hardware module to lower a working voltage of the hardware module to a predetermined value;

In a case of triggered by the second interrupt signal, calling a second program by means of the second program information, and operating the second program to control a clock management unit in the hardware module to turn off a general clock of the hardware module;

in a case of triggered by third interrupt signal, calling a third program by means of the third program information, and operating the third program to control a power supply management unit of the hardware module to disconnect a general power supply of the hardware module.

In this way, different portions of the hardware module can be conveniently controlled through different hardware timers, such that with changes of the waiting duration (for example, continuous extension of the waiting duration), portions of the hardware module with different delays are controlled to execute actions with different energy-saving depths, and enter corresponding waiting states, so that the hardware module achieves a better balance between energy-saving and performance.

In some examples, another implementation process of step S203 to step S204 may include:

Under triggering from the first interrupt signal, querying a log sheet for a first timer to determine first program information corresponding to a second preset threshold which is closest to the current waiting duration and less than or equal to the current waiting duration, calling a first program by using the first program information, and operating the first program to control a power supply management unit of the hardware module to execute a first action for a working parameter of the hardware module.

Under triggering from the second interrupt signal, querying a log sheet for a second timer to determine second program information corresponding to a second preset threshold which is closest to the current waiting duration and less than or equal to the current waiting duration, calling a second program by using the second program information, and operating the second program to control a clock management unit of the hardware module to execute a second action for a clock of the hardware module.

Under triggering from the third interrupt signal, querying a log sheet for a third timer to determine a third program information corresponding to a third preset threshold which is closest to the current waiting duration and less than or equal to the current waiting duration, calling a third program by using the third program information, and operating the third program to control a power supply management unit of the hardware module to execute a third action for a power supply of the hardware module.

In some examples, the first action may include one or more of the following actions: lowering a working frequency of the hardware module; and lowering a working voltage of the hardware module. The energy-saving measures related to the working voltages for the entire hardware module and each portion of the hardware module are determined based on the waiting duration, through the first action in combination with different delay conditions of the entire hardware module or a portion of the hardware module, so as to avoid the loss of performance and power consumption caused by repeated state switching.

In some examples, the second action may include one or more of the following actions: turning off a general clock of the hardware module, turning off a clock of an operation circuit in the hardware module; turning off a clock of a controller in the hardware module; and turning off a clock of a cache memory in the hardware module. For example, the second action may include, but is not limited to, writing "0" into a register for a clock signal used for switching a certain device (for example, a multiplier) in the operation circuit to turn off the clock of the device (for example, a multiplier) in the operation circuit. The energy-saving measures for the clocks of the entire hardware module and each portion of the hardware module are determined based on the waiting duration, through the second action in combination with different delay conditions of the entire hardware or a portion of the hardware module, so as to avoid the loss of performance and power consumption caused by repeated state switching.

The third action may include one or more of the following actions: disconnecting a general power supply of the hardware module; disconnecting a power supply of an operation circuit in the hardware module; disconnecting a power supply of a controller in the hardware module; and disconnecting a power supply of a cache memory in the hardware module. In particular, the third action may further include disconnection the power supply of a certain or some of the devices (for example, multiplier or adder) in the operational circuit. The energy-saving measures for the power supply of the entire hardware module and each portion of the hardware module are determined based on the waiting duration, through the third action in combination with different delay conditions of the entire hardware module or a portion of the hardware module, so as to avoid the loss of performance and power consumption caused by repeated state switching.

In some examples, in a case where the currently determined second program information corresponds to a second preset threshold with the minimum value, the second program of the controller may be called by using the second program information, and then it is operated to control the clock management unit of the hardware module to turn off the clock of the controller in the hardware module. In a case where the currently determined second action information corresponds to a second preset threshold with a second minimum value, the second program of the operation circuit is called by using the current second program information, and then it is operated to control the clock management unit of the hardware module to turn off the clock of the operation circuit in the hardware module. And so on, in a case where the currently determined second program information corresponds to a second preset threshold with the maximum value, the second program of the cache memory is called by using the second program information, and then it is operated to control the clock management unit of the hardware module to turn off the clock of the cache memory in the hardware module.

In some examples, in a case where the currently determined third program information corresponds to a preset second threshold with the minimum value, the third program of the controller may be called by using the third program information, and then it is operated to control the power supply management unit of the hardware module to disconnect the power supply of the controller in the hardware module;

In some examples, in a case where the currently determined third program information corresponds to a preset second threshold with a second minimum value, the third program of the operation circuit is called by using the current third program information, and then it is operated to control the power supply management unit of the hardware module to disconnect the power supply of the operation circuit in the hardware module;

In some examples, in a case where the currently determined third program information corresponds to a preset second threshold with the maximum value, the third program of the cache memory may be called by using the current third program information, and then it is operated to control the power supply management unit of the hardware module to disconnect the power supply of the cache memory in the hardware module.

In the embodiment of the present disclosure, it may further include: controlling the hardware module to recover to the working state under triggering from a call request of the hardware module. In this way, in a case where a task needs to be executed, the operation for recovering the working state of the hardware module can be executed in time, thus improving the response capability of the hardware module and the efficiency of processing tasks, and then achieving the goal of controlling the AI processor to better balance the energy saving and the performance.

As an example, an AI processor of the system in FIG. 1 is used as a hardware module in the present disclosure to describe an exemplary implementation process of the embodiments of the present disclosure.

The AI processor may include a buffer memory, an operation circuit, and a controller. These three parts of the AI processor may be powered independently, i.e. these three parts are respectively connected with the power supply control part in the system power supply/clock circuit 12 in the AI chip through their respective power supply lines and/or power supply interfaces. Moreover, clocks of these three parts in the AI processor can also be independent, i.e. these three parts may also be respectively connected with the clock control part within the system power supply/clock circuit 12 in the AI chip through their respective clock circuits and/or interfaces. Moreover, the delays of the three parts are different. In this example, the operating parameters, the clocks, and the powers of the three parts in the AI processor can be respectively controlled based on the length of the waiting duration through configuring three hardware timers.

In the AI operation of the AI processor, an AI task is initiated by an application operating in the main control processor, and the main control processor issues corresponding task to the AI processor and is notified by each AI processor after each AI task is completed. Usually, the AI processor does not know when the application will issue tasks, so it can only wait. In the embodiment of the present disclosure, it is assumed that three hardware timers are pre-configured, wherein timer 1 corresponds to a working voltage of the AI processor, timer 2 corresponds to clock control of the AI processor, and timer 3 corresponds to power supply control of the AI processor. N (n is a positive integer) thresholds can be set, and the n thresholds are the first preset threshold and/or the second preset threshold as mentioned above. It is assumed that the n thresholds include a threshold $t_1$, a threshold $t_2$, a threshold $t_3$ ..., threshold $t_n$, and $t_1 > t_2 > t_3 > ... > t_n$. It is assumed that a first preset threshold of the timer 1 is t1, a first preset threshold of the timer 2 is t2 and each of t3-t5 are second preset thresholds of the timer 2, and a first preset threshold of the timer 3 is t6 and t7-*tn* are second preset thresholds of the timer 3. T1 corresponds to program information b1 used to execute an action a1, t2 corresponds to program information b2 used to execute an action a2, . . . , and so on, tn corresponds to program information bn used to execute an action an. The action a1 belongs to the first action as mentioned above, actions a2-a5 belong to the second action as mentioned above, actions a6~an belong to the third action as mentioned above. The program b1 identified by the program information b1 belongs to the first program as mentioned above, the programs b2-b5 identified by the program information b2-b5 belong to the second program as mentioned above, and the programs b6-*bn* identified by the program information b6-*bn* belong to the third program as mentioned above.

If the current waiting duration of the AI processor is less than the threshold t2 but greater than the threshold t1, the timer 1 generates a first interrupt signal, and looks up that the waiting duration corresponds to the program information b1, then calls the program b1 by the program information b1 and operates it, and then controls the corresponding part of the AI processor to perform the action a1, for example, adjusting the working voltage of the AI processor to a predetermined value less than the current voltage value, and the like. If the current waiting duration of the AI processor is less than the threshold t5 but greater than the threshold t4, the timer 2 generates a second interrupt signal, and looks up the program information b4 corresponding to the waiting duration, then calls the program b4 by using the program information b4 and operates it, and then controls the corresponding part of the AI processor to perform the action a4, for example, turning off the clock of the operation circuit in the AI processor, and the like. If the current waiting duration of the AI processor is less than the threshold t8 but greater than the threshold t7, the timer 3 generates a third interrupt signal, and looks up that the program information b7 corresponds to the waiting duration, then call the program b7 by using the program information b7 and operate it, and then controls the corresponding part of the AI processor to perform the action a7, for example, disconnecting the power supply of the buffer memory in the AI processor, and the like. In this way, an action of gradually deepening the energy-saving depth is performed by adopting a threshold which is increased gradually in the process of increasing the waiting duration, so that the AI processor can be controlled to achieve better balance between energy-saving and performance.

Once a task is issued, the AI processor can be controlled to exit the waiting state and resume the working state. In this way, the AI processor is controlled to switch between the waiting state and the working state with different power consumption degrees, so that the AI processor is controlled to have a better balance between energy saving and performance, thus realizing a good balance of the hardware module between energy saving and performance, effectively avoiding affecting the task execution of the hardware module due to the hardware module frequently entering and/or exiting the waiting state of different energy-saving conditions, meanwhile, reducing the power consumption overhead caused by the hardware module frequently entering and/or exiting the waiting state of different energy-saving conditions.

Exemplary Apparatuses

Figure 3:
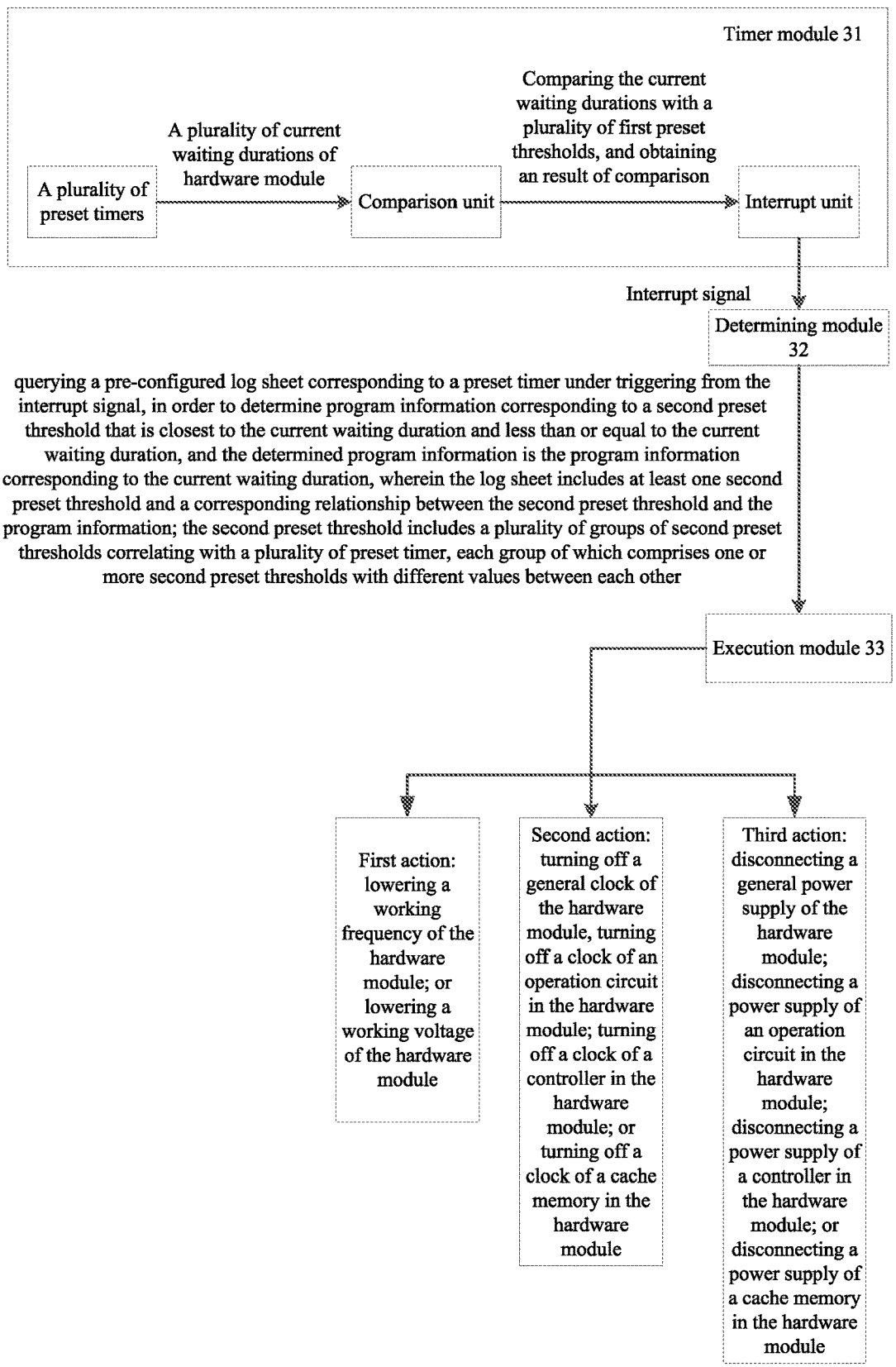
FIG. 3 is a structure diagram of an apparatus for controlling a hardware module provided by another exemplary embodiment of the present disclosure.

FIG. 3 is a schematic structural diagram of an apparatus for controlling a hardware module in an embodiment of the present disclosure. As shown in FIG. 3, the apparatus for controlling a hardware module in the embodiment of the present disclosure may include:

a timer module 31, which is configured to time a waiting state of the hardware module to obtain current waiting duration of the hardware module when the hardware module enters a first waiting state, and to generate an interrupt signal based on the current waiting duration;

a determining module 32, which is configured to determine program information corresponding to the current waiting duration under the trigger of the interrupt signal;

an execution module 33, which is configured to execute an action corresponding to the program information for the hardware module, and to control the hardware module to enter a second waiting state.

In some examples, the timer module 31 may include a comparison unit, which is configured to compare the current waiting duration of the hardware module with a first preset threshold; and an interrupt unit, which is configured to generate an interrupt signal in response to a result of comparison.

In the above mentioned example, the interrupt unit may be specifically configured to generate an interrupt signal in a case where the result of comparison indicates that the current waiting duration exceeds a first preset threshold corresponding to a preset timer, and the interrupt signal is used for triggering one or more of the following actions: a first action related to a working parameter, a second action related to a clock, and a third action related to a power supply.

In some examples, the execution module 33 may be specifically configured to call a corresponding program by using the program information and operate it to execute one or more of the following actions: lowering a working voltage of the hardware module to a predetermined value, turning off a general clock of the hardware module, and disconnecting a general power supply of the hardware module.

In some examples, the preset timer may include multiple preset timers, and the first action, the second action, and the third action may respectively correspond to one or more of the multiple preset timers.

In some examples, the determining module 32 may be specifically configured as: querying a pre-configured log sheet corresponding to a preset timer under triggering from the interrupt signal, in order to determine program information corresponding to a second preset threshold that is closest to the current waiting duration and less than or equal to the current waiting duration, and the determined program information is the program information corresponding to the current waiting duration, wherein the log sheet includes at least one second preset threshold and a corresponding relationship between the second preset threshold and the program information.

In some examples, the first preset threshold may include a plurality of first preset thresholds correlating with a plurality of the preset timers, values of which are different; and/or, the second preset threshold includes a plurality of groups of second preset thresholds correlating with a plurality of preset timer, each group of which comprises one or more second preset thresholds with different values between each other.

In some examples, the first action may include one of the following actions or any combination thereof: lowering a working frequency of the hardware module; and lowering a working voltage of the hardware module.

In some examples, the second action may include one of the following actions or any combination thereof: turning off a general clock of the hardware module, turning off a clock of an operation circuit in the hardware module; turning off a clock of a controller in the hardware module; and turning off a clock of a cache memory in the hardware module.

In some examples, the third action may include one of the following actions or any combination thereof: disconnecting a general power supply of the hardware module; disconnecting a power supply of an operation circuit in the hardware module; disconnecting a power supply of a controller in the hardware module; and disconnecting a power supply of a cache memory in the hardware module.

In some examples, the program information may include a storage address of corresponding program in the memory.

In some examples, the above mentioned execution module 33 may also be configured to control the hardware module to recover to the working state in a case of triggering from a call request of the hardware module.

Exemplary Electronic Devices

Figure 4:
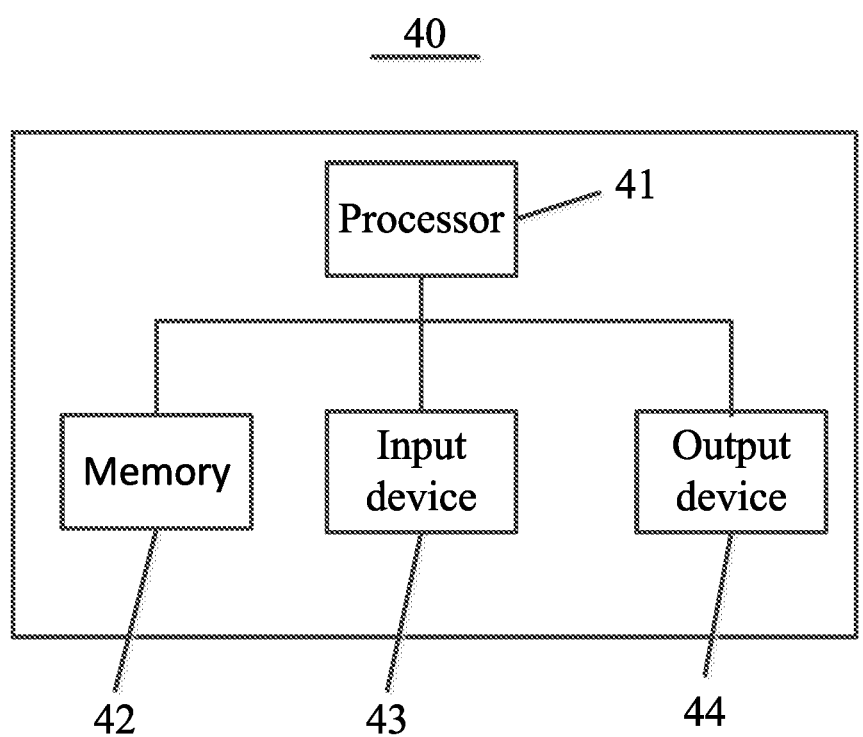
FIG. 4 is a structure diagram of an electronic device provided by an exemplary embodiment of the present disclosure.

FIG. 4 illustrates a block diagram of an electronic device according to an embodiment of the present disclosure.

As shown in FIG. 4, an electronic device 40 includes one or more processors 41 and a memory 42.

The processor 41 may be a central processing unit (CPU) or a processing unit which is in other forms and has a data processing capability and/or an instruction executing capability, and may control other components in the electronic device 40 to execute desired functions.

The memory 42 may include one or more computer program products which may include various forms of computer readable storage medium, such as a volatile memory and/or a nonvolatile memory. The volatile memory may include, for example, a random access memory (RAM) and/or a cache, or the like. The nonvolatile memory may include, for example, a read-only memory (ROM), a hard disk, a flash memory, and the like. One or more computer program instructions may be stored in the computer readable storage medium, and the processor 41 may operate the program instructions to implement the method of controlling a hardware module and/or other desired functions of various embodiments of the present disclosure described above.

In an example, the electronic device 40 may further include an input device 43 and an output device 44 that are interconnected by a bus system and/or a connection mechanism in other forms (not shown). For example, the input device 43 may be a microphone or a microphone array. The input device 43 may further include, for example, a keyboard, a mouse and the like. The output device 44 may output various information. The output device 44 may include, for example, a display, a speaker, a printer, a communication network and a remote output device which is connected to the communication network, and the like.

Certainly, for the sake of simplicity, FIG. 4 only shows some of the components of the electronic device 40 related to the present application, and omits components such as a bus, an input/output interface, and the like. In addition, the electronic device 40 may further include any other suitable components according to specific application situations.

Exemplary Computer Program Products and Computer Readable Storage Media

In addition to the method and device described above, embodiments of the present application may also be a computer program product including computer program instructions that, when executed by a processor, cause the processor to execute the steps in the method of controlling a hardware module according to various embodiments of the present application as described in the above section "Exemplary Methods" of the present specification.

The computer program product may program a program code for executing the operations of the embodiments of the present application in any combination of one or more programming languages. The programming language includes an object-oriented programming language, such as Java, C++, and the like, and further includes a conventional procedural programming language, such as "C" language or similar programming languages. The program code may be executed entirely on a user computing device, be executed partially on a user device, be executed as a separate software package, be executed partially on the user computing device and partially on a remote computing device, or be executed entirely on the remote computing device or a server.

In addition, embodiments of the present application may also be a computer readable storage medium storing computer program instructions that, when executed by a processor, cause the processor to perform the steps in the method of controlling a hardware module according to various embodiments of the present application as described in the above section "Exemplary Methods" of the present specification.

The computer readable storage medium may adopt any combination of one or more readable medium. The readable medium may be a readable signal medium or a readable storage medium. The readable storage medium may include, but not limited to, for example, electronic, magnetic, optical, electromagnetic, infrared or a semiconductor system, apparatus or device, or any combinations of the above. More specific examples (non-exhaustive list) of the readable storage medium may include an electrical connection having one or more wires, a portable disk, a hard disk, a Random Access Memory (RAM), a Read-Only Memory (ROM), an Erasable Programmable Read-Only Memory (EPROM or a Flash memory), an optical fiber, a Portable Compact Disc Read-Only Memory (CD-ROM), an optical storage device, a magnetic storage device, or any suitable combination of the above.

The basic principles of the present disclosure have been described above in connection with specific embodiments. However, it needs to be noted that merits, advantages, effects, and the like mentioned in the present disclosure are merely exemplary and not restrictive, and the merits, advantages, effects, and the like are not considered to be requisite in embodiments of the present disclosure. In addition, the specific details of the above application are only for the purpose of illustration and ease of understanding, and are not for a limiting purpose. The above details do not limit the present disclosure to being implemented with the above specific details.

The block diagrams of components, apparatuses, devices and systems mentioned in the present disclosure are merely exemplary examples, and not intended to require or imply that connection, arrangement and configuration be performed in the manners shown in the block diagrams. As will be appreciated by those skilled in the art, these components, apparatus, devices and systems may be connected, arranged, and configured in any manner. Words such as "including," "comprising," "having," and the like are open-ended words, referring to "including but not limited to," and may be used therewith interchangeably. The word "or" and "and" used herein refer to a word "and/or," and may be used therewith interchangeably unless the context indicates otherwise clearly. The word "such as" used herein refers to a phrase "such as but not limited to," and may be used therewith interchangeably.

It needs also to be noted that in the devices, apparatuses and methods of the present disclosure, various components or steps may be divided and/or re-combined. These divisions and/or re-combinations should be considered as equivalent solutions of the present disclosure.

The above description of the disclosed aspects is provided to enable any person skilled in the art to make or use the present disclosure. Various modifications to these aspects are obvious to those skilled in the art, and the general principles defined herein may be applied to other aspects without departing from the scope of the application. Therefore, the present disclosure is not intended to be limited to the aspects shown herein, but covers the broadest scope consistent with the principles and novel features disclosed herein.

The foregoing description has been presented for purposes of illustration and description. In addition, the description is not intended to limit the embodiments of the present disclosure to the forms disclosed herein. Although multiple example aspects and embodiments have been discussed above, those skilled in the art would recognize certain variations, modifications, changes, additions and sub-combinations thereof.

What is claimed is:

1. A method for controlling a hardware module, comprising:
    timing a waiting state of the hardware module to obtain a current waiting duration of the hardware module when the hardware module enters a first waiting state;
    generating an interrupt signal based on the current waiting duration;
    determining program information corresponding to the current waiting duration under triggering from the interrupt signal; and
    executing an action, for the hardware module, corresponding to the program information, and controlling the hardware module to enter a second waiting state,
    wherein generating the interrupt signal based on the current waiting duration, comprising: comparing the current waiting duration of the hardware module with a first preset threshold, and generating the interrupt signal in response to a result of comparison, and
    wherein determining the program information corresponding to the current waiting duration under triggering from the interrupt signal, comprises: querying a pre-configured log sheet corresponding to a preset timer under triggering from the interrupt signal to determine the program information corresponding to a second preset threshold which is closest to the current waiting duration and less than or equal to the current waiting duration, and the determined program information is the program information corresponding to the current waiting duration, and wherein the log sheet includes at least one second preset threshold and its corresponding relationship with the program information;
    wherein the method further comprises setting a plurality of timers configured to control different aspects of the hardware module and configuring a log sheet for each timer, and configuring a first preset threshold and a second preset threshold for each timer, wherein the first preset thresholds of the timers are increasing one by one, and the second preset threshold of a timer is between the first preset threshold of the same timer and the immediately subsequently larger first preset threshold of a timer.

2. The method of claim 1, wherein executing the action corresponding to the program information for the hardware module comprises:
    calling a corresponding program by using the program information and operating it to execute one or more of following actions: lowering a working voltage of the hardware module to a predetermined value, turning off a general clock of the hardware module, and disconnecting a general power supply of the hardware module.

3. The method of claim 1, wherein generating the interrupt signal in response to the result of the comparison comprises:
    generating the interrupt signal in a case where the result of comparison indicates that the current waiting duration exceeds the first preset threshold corresponding to a preset timer, wherein the interrupt signal is used for triggering one or more of following actions: a first action related to a working parameter, a second action related to a clock, and a third action related to a power supply.

4. The method of claim 3, wherein the first action at least comprises one of following actions: lowering a working frequency of the hardware module; and
    lowering a working voltage of the hardware module, and/or the second action at least comprises one of following actions: turning off a general clock of the hardware module, turning off a clock of an operation circuit in the hardware module; turning off a clock of a controller in the hardware module; and turning off a clock of a cache memory in the hardware module; and/or
    the third action at least comprises one of following actions: disconnecting a general power supply of the hardware module; disconnecting a power supply of the operation circuit in the hardware module; disconnecting a power supply of the controller in the hardware module; and disconnecting a power supply of the cache memory in the hardware module.

5. The method of claim 3, wherein executing the action corresponding to the program information for the hardware module comprises:
    calling a corresponding program by using the program information and operating it to execute one or more of following actions: lowering a working voltage of the hardware module to a predetermined value, turning off a general clock of the hardware module, and disconnecting a general power supply of the hardware module.

6. The method of claim 3, wherein the first preset threshold comprises a plurality of first preset thresholds correlating with a plurality of the preset timers, values of which are different each other; and/or, the second preset threshold includes a plurality of groups of second preset thresholds correlating with a plurality of the preset timer, wherein each group of the second preset thresholds comprise one or more second preset thresholds having different values.

7. The method of claim 6, wherein the first action at least comprises one of following actions: lowering a working frequency of the hardware module; and lowering a working voltage of the hardware module, and/or
    the second action at least comprises one of following actions: turning off a general clock of the hardware module, turning off a clock of an operation circuit in the hardware module; turning off a clock of a controller in the hardware module; and turning off a clock of a cache memory in the hardware module; and/or the third action at least comprises one of following actions: disconnecting a general power supply of the hardware module; disconnecting a power supply of the operation circuit in the hardware module; disconnecting a power supply of the controller in the hardware module; and disconnecting a power supply of the cache memory in the hardware module.

8. The method of claim 1, wherein the power consumption in the first waiting state is higher or lower than that in the second waiting state.

9. The method of claim 1,
wherein setting the plurality of timers comprising:
setting a first timer, a second timer and a third timer,
respectively configuring the first timer, the second timer, and the third timer with a first preset threshold of the first timer, a first preset threshold of the second timer, and a first preset threshold of the third timer, wherein the first preset threshold of the first timer is less than the first preset threshold of the second timer, and the first preset threshold of the second timer is less than the first preset threshold of the third timer, and
respectively configuring the first timer, the second timer, and the third timer with a second preset threshold of the first timer, a second preset threshold of the second timer, and a second preset threshold of the third timer, wherein the second preset threshold of the first timer is larger than the first preset threshold of the first timer and less than the first preset threshold of the second timer, the second preset threshold of the second timer is larger than the first preset threshold of the second timer and less than the first preset threshold of the third timer, and the second preset threshold of the third timer is larger than the first preset threshold of the third timer.

10. The method of claim 1,
wherein setting the plurality of timers comprising:
setting a first timer, a second timer and a third timer,
respectively configuring the first timer, the second timer, and the third timer with a first preset threshold of the first timer, a first preset threshold of the second timer, and a first preset threshold of the third timer, wherein the first preset threshold of the first timer is less than the first preset threshold of the second timer, and the first preset threshold of the second timer is less than the first preset threshold of the third timer, and
respectively configuring the first timer, the second timer, and the third timer with a group of second preset thresholds of the first timer, a group of second preset thresholds of the second timer, and a group of second preset thresholds of the third timer, wherein each second preset threshold of the first timer is larger than the first preset threshold of the first timer and less than the first preset threshold of the second timer, each second preset threshold of the second timer is larger than the first preset threshold of the second timer and less than the first preset threshold of the third timer, and each second preset threshold of the third timer is larger than the first preset threshold of the third timer.

11. The method of claim 10, wherein determining program information corresponding to the current waiting duration under triggering from the interrupt signal; and executing an action, for the hardware module, corresponding to the program information, and controlling the hardware module to enter a second waiting state, comprises:

under triggering from a first interrupt signal generated by the first timer, querying a log sheet for the first timer to determine first program information corresponding to a second preset threshold which is closest to the current waiting duration and less than or equal to the current waiting duration, calling a first program by using the first program information, and operating the first program to control a power supply management unit of the hardware module to execute a first action for a working parameter of the hardware module;

under triggering from a second interrupt signal generated by the second timer, querying a log sheet for the second timer to determine second program information corresponding to a second preset threshold which is closest to the current waiting duration and less than or equal to the current waiting duration, calling a second program by using the second program information, and operating the second program to control a clock management unit of the hardware module to execute a second action for a clock of the hardware module; and under triggering from a third interrupt signal generated by the third timer, querying a log sheet for the third timer to determine a third program information corresponding to a third preset threshold which is closest to the current waiting duration and less than or equal to the current waiting duration, calling a third program by using the third program information, and operating the third program to control a power supply management unit of the hardware module to execute a third action for a power supply of the hardware module.

12. The method of claim 11, wherein under triggering from a second interrupt signal generated by the second timer, querying a log sheet for the second timer to determine second program information corresponding to a second preset threshold which is closest to the current waiting duration and less than or equal to the current waiting duration, calling a second program by using the second program information, and operating the second program to control a clock management unit of the hardware module to execute a second action for a clock of the hardware module, comprises:

in a case where the currently determined second program information corresponds to a second preset threshold with the minimum value, calling the second program of a controller by using the second program information, and then operating the second program of the controller to control a clock management unit of the hardware module to turn off a clock of the controller in the hardware module;

in a case where the currently determined second action information corresponds to a second preset threshold with a second minimum value, calling the second program of an operation circuit by using the current second program information, and operating the second program of the operation circuit to control the clock management unit of the hardware module to turn off a clock of the operation circuit in the hardware module; and, in a case where the currently determined second program information corresponds to a second preset threshold with the maximum value, calling the second program of a cache memory by using the second program information, and then operating the second program of the cache memory to control the clock management unit of the hardware module to turn off a clock of the cache memory in the hardware module.

13. The method of claim 11, wherein under triggering from a third interrupt signal generated by the third timer, querying a log sheet for the third timer to determine a third program information corresponding to a third preset threshold which is closest to the current waiting duration and less than or equal to the current waiting duration, calling a third program by using the third program information, and operating the third program to control a power supply management unit of the hardware module to execute a third action for a power supply of the hardware module, comprises:
  in a case where the currently determined third program information corresponds to a preset second threshold with the minimum value, calling the third program of a controller by using the third program information, and then operating the third program of the controller to control a power supply management unit of the hardware module to disconnect a power supply of the controller in the hardware module;
  in a case where the currently determined third program information corresponds to a preset second threshold with a second minimum value, calling the third program of an operation circuit by using the current third program information, and then operating the third program of the operation circuit to control the power supply management unit of the hardware module to disconnect a power supply of the operation circuit in the hardware module; and
  in a case where the currently determined third program information corresponds to a preset second threshold with the maximum value, calling the third program of a cache memory by using the current third program information, and then operating the third program of the cache memory to control the power supply management unit of the hardware module to disconnect a power supply of the cache memory in the hardware module.

14. The method of claim 1, wherein the program information includes a storage address of corresponding program in a memory.

15. The method of claim 1, wherein the log sheet is implemented through a linked list.

16. An electronic device, comprising:
  one or more processors; and
  a memory, which stores a computer program, when operated by the one or more processors, enabling the processor to execute a method for controlling a hardware module, comprising:
    timing a waiting state of the hardware module to obtain a current waiting duration of the hardware module when the hardware module enters a first waiting state;
    generating an interrupt signal based on the current waiting duration;
    determining program information corresponding to the current waiting duration under triggering from the interrupt signal; and
    executing an action corresponding to the program information for the hardware module, and controlling the hardware module to enter a second waiting state,
  wherein generating the interrupt signal based on the current waiting duration, comprising: comparing the current waiting duration of the hardware module with a first preset threshold, and generating the interrupt signal in response to a result of comparison, and
  wherein determining the program information corresponding to the current waiting duration under triggering from the interrupt signal, comprises: querying a pre-configured log sheet corresponding to a preset timer under triggering from the interrupt signal to determine the program information corresponding to a second preset threshold which is closest to the current waiting duration and less than or equal to the current waiting duration, and the determined program information is the program information corresponding to the current waiting duration, and wherein the log sheet includes at least one second preset threshold and its corresponding relationship with the program information;
  wherein the method further comprises setting a plurality of timers configured to control different aspects of the hardware module and configuring a log sheet for each timer, and configuring a first preset threshold and a second preset threshold for each timer, wherein the first preset thresholds of the timers are increasing one by one, and the second preset threshold of a timer is between the first preset threshold of the same timer and the immediately subsequently larger first preset threshold of a timer.

17. The electronic device of claim 16,
wherein setting the plurality of timers comprising:
setting a first timer, a second timer and a third timer,
respectively configuring the first timer, the second timer, and the third timer with a first preset threshold of the first timer, a first preset threshold of the second timer, and a first preset threshold of the third timer, wherein the first preset threshold of the first timer is less than the first preset threshold of the second timer, and the first preset threshold of the second timer is less than the first preset threshold of the third timer, and
respectively configuring the first timer, the second timer, and the third timer with a second preset threshold of the first timer, a second preset threshold of the second timer, and a second preset threshold of the third timer, wherein the second preset threshold of the first timer is larger than the first preset threshold of the first timer and less than the first preset threshold of the second timer, the second preset threshold of the second timer is larger than the first preset threshold of the second timer and less than the first preset threshold of the third timer, and the second preset threshold of the third timer is larger than the first preset threshold of the third timer.

18. The electronic device of claim 16,
wherein setting the plurality of timers comprising:
setting a first timer, a second timer and a third timer,
respectively configuring the first timer, the second timer, and the third timer with a first preset threshold of the first timer, a first preset threshold of the second timer, and a first preset threshold of the third timer, wherein the first preset threshold of the first timer is less than the first preset threshold of the second timer, and the first preset threshold of the second timer is less than the first preset threshold of the third timer, and
respectively configuring the first timer, the second timer, and the third timer with a group of second preset thresholds of the first timer, a group of second preset thresholds of the second timer, and a group of second preset thresholds of the third timer, wherein each second preset threshold of the first timer is larger than the first preset threshold of the first timer and less than the first preset threshold of the second timer, each second preset threshold of the second timer is larger than the first preset threshold of the second timer and less than the first preset threshold of the third timer, and each second preset threshold of the third timer is larger than the first preset threshold of the third timer.

19. The electronic device of claim 18, wherein determining program information corresponding to the current waiting duration under triggering from the interrupt signal; and executing an action, for the hardware module, corresponding to the program information, and controlling the hardware module to enter a second waiting state, comprises:

under triggering from a first interrupt signal generated by the first timer, querying a log sheet for the first timer to determine first program information corresponding to a second preset threshold which is closest to the current waiting duration and less than or equal to the current waiting duration, calling a first program by using the first program information, and operating the first program to control a power supply management unit of the hardware module to execute a first action for a working parameter of the hardware module;

under triggering from a second interrupt signal generated by the second timer, querying a log sheet for the second timer to determine second program information corresponding to a second preset threshold which is closest to the current waiting duration and less than or equal to the current waiting duration, calling a second program by using the second program information, and operating the second program to control a clock management unit of the hardware module to execute a second action for a clock of the hardware module; and under triggering from a third interrupt signal generated by the third timer, querying a log sheet for the third timer to determine a third program information corresponding to a third preset threshold which is closest to the current waiting duration and less than or equal to the current waiting duration, calling a third program by using the third program information, and operating the third program to control a power supply management unit of the hardware module to execute a third action for a power supply of the hardware module.

20. The electronic device of claim 19, wherein under triggering from a second interrupt signal generated by the second timer, querying a log sheet for the second timer to determine second program information corresponding to a second preset threshold which is closest to the current waiting duration and less than or equal to the current waiting duration, calling a second program by using the second program information, and operating the second program to control a clock management unit of the hardware module to execute a second action for a clock of the hardware module, comprises:

in a case where the currently determined second program information corresponds to a second preset threshold with the minimum value, calling the second program of a controller by using the second program information, and then operating the second program of the controller to control a clock management unit of the hardware module to turn off a clock of the controller in the hardware module;

in a case where the currently determined second action information corresponds to a second preset threshold with a second minimum value, calling the second program of an operation circuit by using the current second program information, and operating the second program of the operation circuit to control the clock management unit of the hardware module to turn off a clock of the operation circuit in the hardware module; and, in a case where the currently determined second program information corresponds to a second preset threshold with the maximum value, calling the second program of a cache memory by using the second program information, and then operating the second program of the cache memory to control the clock management unit of the hardware module to turn off a clock of the cache memory in the hardware module;

or wherein under triggering from a third interrupt signal generated by the third timer, querying a log sheet for the third timer to determine a third program information corresponding to a third preset threshold which is closest to the current waiting duration and less than or equal to the current waiting duration, calling a third program by using the third program information, and operating the third program to control a power supply management unit of the hardware module to execute a third action for a power supply of the hardware module, comprises:

in a case where the currently determined third program information corresponds to a preset second threshold with the minimum value, calling the third program of a controller by using the third program information, and then operating the third program of the controller to control a power supply management unit of the hardware module to disconnect a power supply of the controller in the hardware module;

in a case where the currently determined third program information corresponds to a preset second threshold with a second minimum value, calling the third program of an operation circuit by using the current third program information, and then operating the third program of the operation circuit to control the power supply management unit of the hardware module to disconnect a power supply of the operation circuit in the hardware module; and in a case where the currently determined third program information corresponds to a preset second threshold with the maximum value, calling the third program of a cache memory by using the current third program information, and then operating the third program of the cache memory to control the power supply management unit of the hardware module to disconnect a power supply of the cache memory in the hardware module.

* * * * *